United States Patent
Hwang

[19]
[11] Patent Number: 6,023,374
[45] Date of Patent: Feb. 8, 2000

[54] COMPACTED BEAM PATH EXPANDER, A METHOD FOR EXPANDING BEAM PATH AND A LARGE-AREA LASER PROJECTION DISPLAY SYSTEM HAVING A SMALL COMPACTED OPTICAL SYSTEM

[75] Inventor: Young Mo Hwang, Seoul, Rep. of Korea

[73] Assignee: Samsung Electronics Co., Ltd., Suwon, Rep. of Korea

[21] Appl. No.: 09/090,243

[22] Filed: Jun. 4, 1998

[30] Foreign Application Priority Data

Jul. 3, 1997 [KR] Rep. of Korea ............... 97-30783

[51] Int. Cl.[7] .................................................. G02B 27/12
[52] U.S. Cl. .................................................. 359/639
[58] Field of Search .................... 359/639, 618, 359/495, 263

[56] References Cited

U.S. PATENT DOCUMENTS

| | | | |
|---|---|---|---|
| 4,053,898 | 10/1977 | Hirayama | 436/1 |
| 4,125,864 | 11/1978 | Aughton | 358/298 |
| 4,533,215 | 8/1985 | Trias et al. | 350/347 E |
| 4,720,747 | 1/1988 | Crowley | 358/231 |
| 5,071,225 | 12/1991 | Inoue | 359/634 |
| 5,253,073 | 10/1993 | Crowley | 358/231 |
| 5,311,321 | 5/1994 | Crowley | 348/760 |

FOREIGN PATENT DOCUMENTS 0 211 596  2/1987  European Pat. Off. .
55-25045  2/1980  Japan .

*Primary Examiner*—Georgia Epps
*Assistant Examiner*—Michael A Lucas
*Attorney, Agent, or Firm*—Burns, Doane, Swecker & Mathis, L.L.P.

[57] ABSTRACT

A beam path expander for a large-area laser projection display system having a small compacted optical system includes an incidence plane forming an anti-reflection plane to admit light having a specific wavelength into a medium without reflection, a first total reflection plane that is cut into the beam path expander at a total reflection angle determined by the refractive index of the medium for total-reflecting the light admitted from the incidence plane in the medium, a second total reflection plane that is cut into the beam path expander at a total reflection angle for total-reflecting the light reflected from the first total reflection plane at the total reflection angle in the medium, n third total reflection plane(s) (n=0, 1, 2, . . . ) cut into the beam path expander at the total reflection angle for forming a specific light path by total-reflecting the light reflected from the second total reflection plane into the medium and an outlet plane forming an anti-reflection plane to make the light which is reflected from the third total reflection plane exit from the medium. The beam path expanders are positioned between the focusing lens system and modulators and/or between the modulators and the collimating lens system in a large-area laser projection display system.

13 Claims, 3 Drawing Sheets

Fig. 1 *(THE CONVENTIONAL ART)*

COMPACTED BEAM PATH EXPANDER, A METHOD FOR EXPANDING BEAM PATH AND A LARGE-AREA LASER PROJECTION DISPLAY SYSTEM HAVING A SMALL COMPACTED OPTICAL SYSTEM

FIELD OF THE INVENTION

The present invention for a laser projection display system projecting image information to a screen, relates to a compacted beam path expander, a method for expanding beam path and a large-area laser projection display system having a small compacted optical system. In particular, according to the present invention, a beam path expander is inserted between a focusing lens and an acoustic-optic modulator, between the acoustic-optic modulator and a collimating lens, or between the focusing lens and the acoustic-optic modulator as well as between the acoustic-optic modulator and the collimating lens.

DESCRIPTION OF THE RELATED ART

The conventional laser projection display system as illustrated in FIG. 1 comprises a laser beam as a light source 10, and an optical system 20 comprising a high-reflection mirror 21 changing the light path of the laser beam, a collimating lens 22 changing the laser beam having the modified light path into parallel light beams, and a reducing lens system 23, 24 to reduce the magnitude of the laser beam that is modified into the parallel light beams. The system further comprises an optical separating sub-system 25 comprising a dichroic mirror system 67a, 68a and a high-reflection mirror 69a separating the reduced laser beam into monochromatic light beams of red, green and blue (R, G, B), and focusing lenses 64a, 65a, 66a focusing the laser beam separated into R, G, B, monochromatic light beams on acousto-optic modulators 61, 62, 63, respectively. The acousto-optic modulators 61, 62, 63 modulate the focused laser beam according to an image signal. The collimating lenses 64b, 65b, 66b restore the modulated laser beam into parallel light form. The optical integrating sub-system 65 comprising the dichroic mirror system 67b, 68b and the high-reflection mirror 69b integrate the restored laser beam having the parallel light form. Polygonal mirror 80 scans horizontally the laser beam integrated from the optical integrating sub-system. A galvanometer 70 is provided for vertical scanning, an fθ lens system 34 is located between the polygonal mirror 80 and the image is projected onto a screen 90.

In the reducing lens system 23, 24, according to one embodiment, front reducing lens 23 has long focal length, and rear reducing lens 24 has short focal length.

The dichroic mirror system 67a, 68a and high-reflection mirror 69a play a role in separating white light into light beams of R, G, B and changing the light path of the monochromatic light beams.

The dichroic mirror system 67b, 68b, along with high-reflection mirror 69b, also plays a role in integrating the beam separated into R, G, B components, into white light again, and changing the path of the white light.

In general, the conventional means of representing images are flat-elements such as cathode ray tubes (CRTs) or liquid crystal devices (LCDs). However, the more devices such as CRTs or LCDs are made into large-area type devices, the more difficult it is manufacture and the more resolution is decreased. Accordingly, there are limits to put to practice CRTs or LCDs as large-area display type devices.

The conventional way to make large-area displays was magnifying the image by a lens and projecting it to a screen. However, this way has disadvantages in that the displaying quality being projected onto the screen is not sharp, and the brightness is low because the light source output is limited by the temperature characteristic of the display representing means.

As an alternative, a display projection system using a laser has developed. In the laser display projection system, as stated above, the horizontal scanning angle determines the screen size in a laser projection display system illustrated in FIG. 1, and the number of mirror planes or sides of the polygonal mirror determines the horizontal scanning angle (θ) in accordance with the following Equation 1.

Equation 1

$$\theta = 720°/\text{number of polygonal mirror planes}$$

For example, in the case of a 24-planes polygonal mirror, in accordance with Equation 1, the horizontal scanning angle is fixed at 30°.

On the other hand, the galvanometer moves only up and down, so the vertical scanning angle can be adjusted arbitrarily.

Therefore, to embody a display having a screen ratio of four to three in the composition, the ratio can be obtained only by adjusting the vertical scanning angle.

To implement a moving picture by a NTSC (National Television System Committee) display signal, 30 screens per 1 second should be made by 525 scan lines. This implies that 15,750 scan lines per second are processed, and the frequency value is 15.75 KHz. In the case of preparing a 24-planes polygonal mirror to handle the scan lines with the required speed, it demands 24-scan lines per 1 revolution, so a revolution speed of 39,375 RPM (Revolution Per Minute) is required to perform 656.25 revolutions per 1 second to handle 15,750 scan lines per 1 second.

However, the conventional projection display system as noted above has problems in that it is necessary to focus with focusing lenses 64a, 65a, 66a having very long focal lengths to maintain sufficient speed of the optical signal processing at the acousto-optic modulators 61, 62, 63. In this case, the laser beam modulated at the acousto-optic modulators should then also maintain an interval from the collimating lenses 64b, 65b, 66b which is approximately equal to that focal length.

SUMMARY OF THE INVENTION

The present invention for solving the conventional problems is intended to provide the laser projection display system by inserting beam path expanders between the focusing lenses and the acoustic-optic modulator or between the acoustic-optic modulators and the collimating lenses, or between the focusing lenses and the acoustic-optic modulators and between the acoustic-optic modulators and the collimating lenses.

An object of the present invention is to provide a beam path expander for realizing a compact type laser projection display system in the invention.

Another object of the present invention is to provide a method for expanding beam path in an optical system to reduce the beam path in a display system including that optical system.

Another object of the invention is to provide a large-area laser projection display system having a small compacted optical system.

To achieve the above object, one preferable embodiment of a beam path expander of according to the present invention includes:

an incidence plane forming an anti-reflection plane to admit light having a specific wavelength into a medium having an arbitrary refractive index without reflection, a first total reflection plane that is cut into the beam path expander at a total reflection angle determined by the refractive index of the medium for total-reflecting the light admitted from the incidence plane in the medium;

a second total reflection plane that is cut into the beam path expander at a total reflection angle for total-reflecting the light reflected from the first total reflection plane at the total reflection angle in the medium;

n third total reflection plane(s) (n=0, 1, 2, ... ) cut into the beam path expander at the total reflection angle for forming a specific light path by total-reflecting the light reflected from the second total reflection plane into the medium; and an outlet plane forming an anti-reflection plane to make the light which is reflected from the third total reflection plane exit the medium.

It is preferable that the incidence plane and outlet planes are vertical to the incident light and outgoing light respectively.

One embodiment of a method for expanding beam path according to the invention includes steps of:

admitting light having a specific wavelength into a medium without reflection;

first-reflecting the admitted light in the medium at a total reflection angle determined by the refractive index of the medium;

second-reflecting the first-reflected light in the medium at the total reflection angle;

third-reflecting the second-reflected light forward at the total reflection angle in a direction opposite to the direction of the light admitted into the medium, repeating the total reflections such as the second reflection and third reflection for forming a specific light path; and permitting the reflected light to exit the medium.

According to one embodiment of the present invention, in a large-area laser projection display system including a laser light source, an optical system for making light from the light source into an arbitrary parallel light, an optical separating sub-system for separating the parallel light from the optical system into the light having a specific wavelength, an acousto-optic modulator, a focusing lens system for focusing the light from the optical separating sub-system on the acousto-optic modulator, a collimating lens system for making the light from the acousto-optical modulator into parallel light, an optical integrating sub-system for integrating the light from the collimating lens system into one light beam, and an optical system for scanning the light beam from the optical integrating sub-system horizontally and vertically, one embodiment of a large-area laser projection display system having a small compacted optical system according to the present invention includes beam path expanders that are located between the focusing lens system and the acousto-optic modulators, or between the acousto-optic modulators and the collimating lens system, or between the focusing lens system and the acousto-optic modulators as well as between the acousto-optic modulators and the collimating lens system.

According to one embodiment of the present invention, the laser light source is white-light.

According to one embodiment of the present invention, the acousto-optic modulators, focusing lenses and collimating lens systems are each comprised of three devices corresponding to the laser beam of red, green and blue respectively.

BRIEF DESCRIPTION OF THE DRAWINGS

Other objects and advantages of the invention will become apparent upon reading the following detailed descriptions and upon reference to the drawing.

Figure 1:
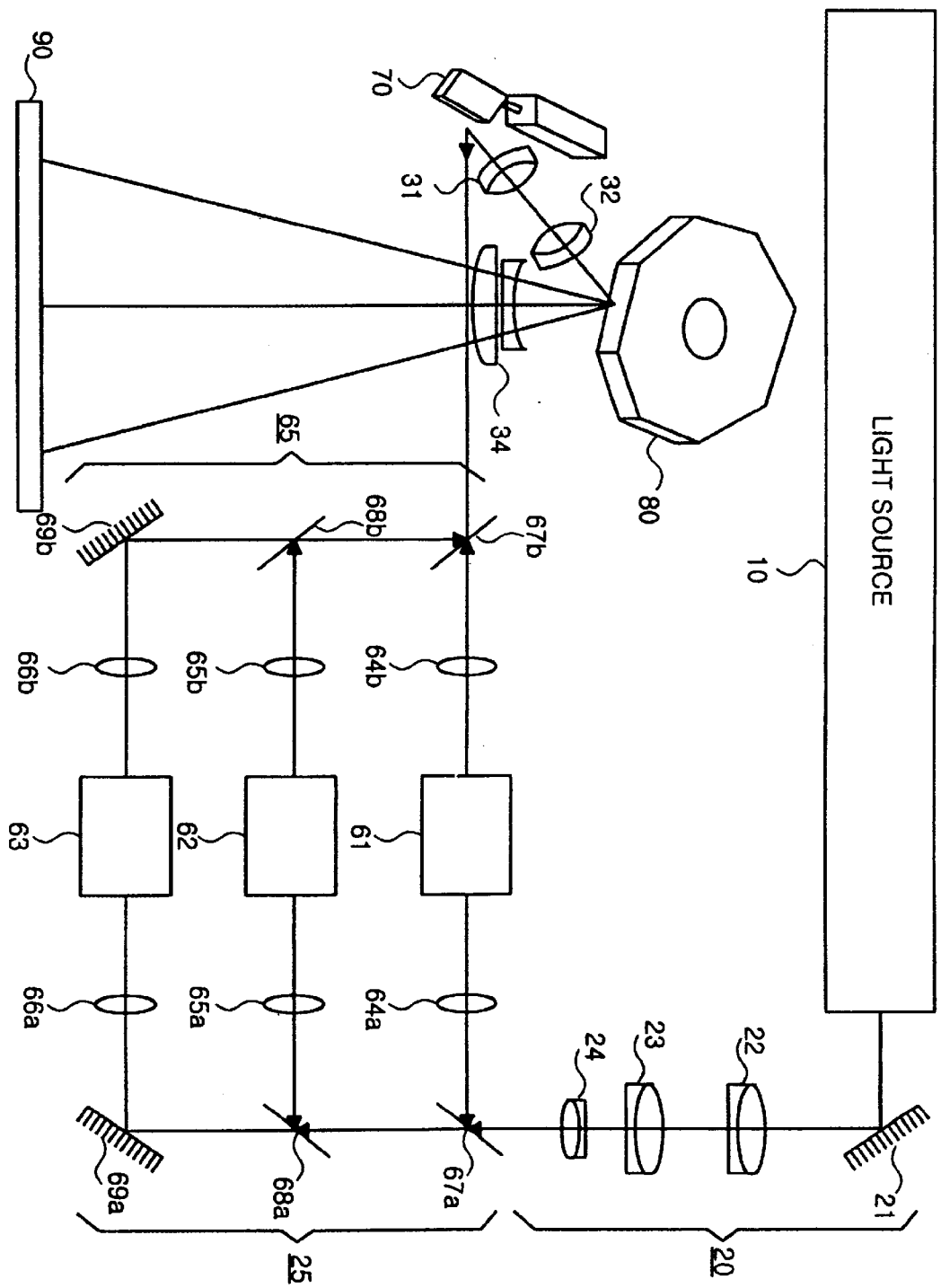
FIG. 1 illustrates a structure of a conventional laser projection display system.

The descriptions of important symbols used in the above drawings are as follows:

20: optical system
25: optical separating sub-system
65: optical integrating sub-system
21, 69a, 69b: high reflection mirrors
64a, 65b, 66a: focusing lens system
22, 64b, 65b, 66b: collimating lens system
23, 24: reducing lens system
230, 240: magnifying lens system
67a, 67b, 68a, 68b: dichroic mirror
61, 62, 63: acousto-optic modulators
70: galvanometer
31, 32: relay lens system
34: fθ lens system
80: polygonal mirror
90: screen
100: beam path expander
102: outlet plane
105: (first) total reflection plane
106: second total reflection plane
107: third total reflection plane
L: length of the total reflection plane While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

The invention will be explained in detail through the drawings.

Figure 2:
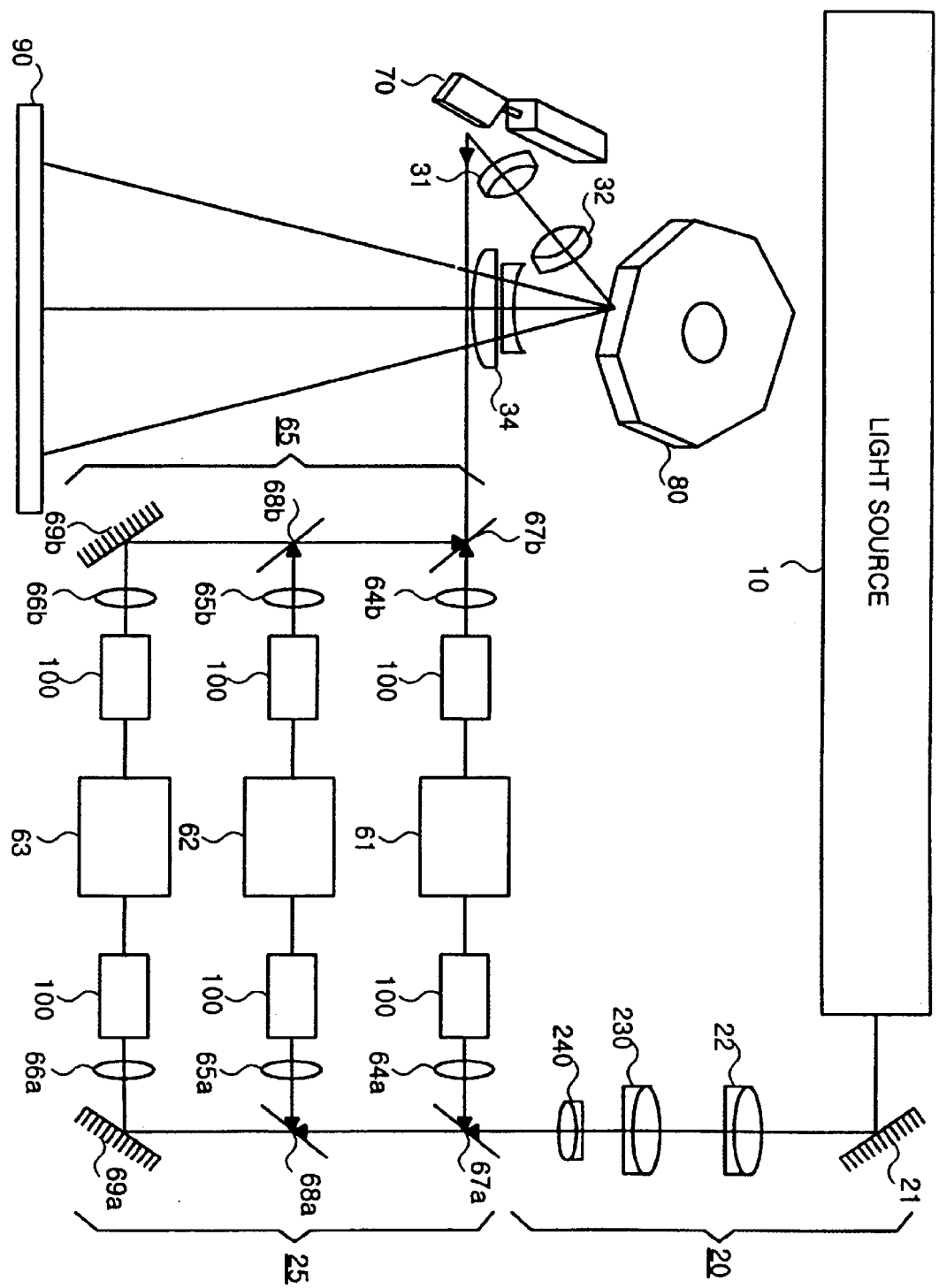
FIG. 2 illustrates a structure of a laser projection display system of the present invention.

The laser projection display system of the present invention is shown in FIG. 2. In the magnifying lens system 230, 240, the front-magnifying lens 230 has a short focal length and the rear-magnifying lens 240 has a long focal length. In this way, the capability of signal processing of the modulators 61, 62, 63 is maintained at the maximum. According to one embodiment, the modulators 61, 62, 63 are acousto-optic modulators. However, the modulators 61, 62, 63 may be provided as any equivalent modulators within the skill of the ordinary artisan.

The dichroic mirror system 67a, 68a and high reflection mirror 69a separate white light into the beams of red, green and blue monochromatic light, and change the light path of the monochromatic light. The dichroic mirror system 67b, 68b and high reflection mirror 69 integrate the lights that are separated into red, green and blue components into the white light, and change the light path of the white light.

One embodiment of the present invention provides a laser light source emitting white light. However, any equivalent light source may be used within the skill of the ordinary artisan.

According to one embodiment of the present invention, the modulators, the focusing lens system and the collimating lens system are each comprised of three devices corresponding to laser beams of red, green and blue frequencies, respectively.

The composition of beam path expander 100 and the method for expanding the beam path according to the present invention will be explained in detail, referring to FIG. 3.

The beam separated in the optical separating sub-system 25 is folded several times in the beam path expander 100 before entering the acousto-optic modulators 61, 62, 63. Therefore the space that the compacted optical system has occupied in the conventional system is reduced and the reduction makes the laser projection display system smaller.

The beam path expander 100 according to the present invention is characterized in that it comprises a low-reflection-processed incidence plane 101, a low-reflection-processed outlet plane 102 and several total reflection planes 105, 106, 107. The laser beam passes through the incidence plane 101 and is admitted into the medium forming the beam path expander. The admitted laser beam travels straight on and then is reflected repeatedly several times by the total reflection planes 105, 106, 107 . . . , finally exiting the medium through the outlet plane 102.

That is, the conventional focusing lens system has a light path that is a straight line. In contrast, according to the present invention, it is possible to lengthen the light path by using a shorter compacted optical system because of the repeated reflections of the laser beam in the beam path expander 100 through several total reflection planes. The interval between the focusing lenses 64a, 65a, 66a and the acousto-optic modulators 61, 62, 63 in the conventional art needs 30 cm. In contrast, the present invention can obtain a similar efficiency using only an interval of about 5 cm.

Figure 3:
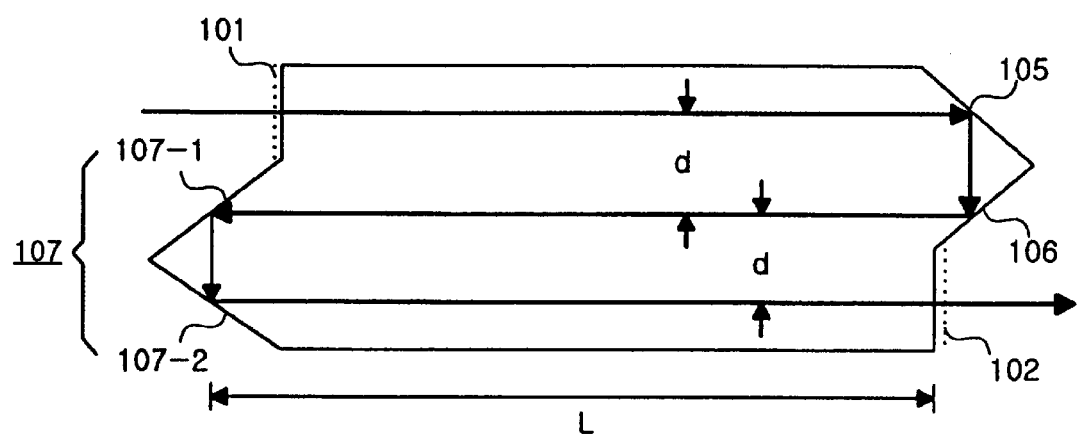
FIG. 3 illustrates a detailed view of a compacted beam path expander.

Referring to FIG. 3, the laser beam goes through the incidence plane 101 and is admitted into the medium of the beam path expander. The total reflection planes 105, 106, and 107 reflect the admitted laser beam. The total reflection plane 107 consists of two pairs of planes 107-1 and 107-1. The laser beam, after reflection by the reflection planes 105, 106 and 107, exits the medium through the outlet plane 102 in the same direction as it was admitted into the beam path expander through the incidence plane, and it is then passed into the modulators 61, 62, 63.

The total path can be represented as 3 times (folding time)×5 cm (L)×n (refractive index of beam path expander)+n (refractive index of total reflection plane)×2 d (interval between folded beams). If the folding time is increased, it is possible to further reduce the length (L) of the beam path expander 100. Therefore, the folding time can play an important role in making a laser projection display system small-sized.

The beam path expander of the present invention includes:

an incidence plane 101 forming an anti-reflection plane to admit light having a specific wavelength into a medium having an arbitrary refractive index without reflection;

first total reflection plane 105 that is cut into the beam path expander at a total reflection angle determined by the refractive index of the medium for total-reflecting the light admitted from the incidence plane in the medium;

second total reflection plane 106 that is cut into the beam path expander at a total reflection angle for total-reflecting the light reflected from the first total reflection plane at the total reflection angle in the medium;

n third total reflection plane(s) 107 (n=0, 1, 2, . . . ) cut into the beam path expander at the total reflection angle for forming a specific light path by total-reflecting the light reflected from the second total reflection plane into the medium; and an outlet plane 102 forming an anti-reflection plane to make the light that is reflected from the third total reflection plane exit from the medium.

The method for expanding a beam path with a beam path expander configured as described above includes the steps of:

admitting light having a specific wavelength into a medium without reflection;

first-reflecting the admitted light in the medium at a total reflection angle determined by the refractive index of the medium;

second-reflecting the first-reflected light in the medium at the total reflection angle;

third-reflecting the second-reflected light forward at the total reflection angle so that the light travels in a direction opposite to a direction of the light admitted into the medium;

repeating the total reflections such as the second reflection and third reflection for forming a specific light path; and exiting the reflected light from the medium.

Because the beam path expander of the present invention as noted above is inserted between the focusing lens system and modulators, or between the modulators and the collimating lens system, or between the focusing lens system and the modulators as well as between the modulators and the collimating lens system and it is designed such that the laser beam is repeatedly reflected in the beam path expander, it is possible to decrease the size of the laser projection display system.

What is claimed is:

1. A beam path expander comprising:

an incidence plane forming an anti-reflection plane to admit light having a specific wavelength into a medium having arbitrary refractive index without reflection;

a first total reflection plane that is cut into the beam path expander at a total reflection angle determined by the refractive index of said medium for total-reflecting the light admitted from said incidence plane in said medium;

a second total reflection plane that is cut into the beam path expander at said total reflection angle for total-reflecting the light reflected from said first total reflection plane at said total reflection angle in said medium;

n third total reflection plane(s) (n=0, 1, 2, . . . ) cut into the beam path expander at said total reflection angle for forming a specific light path by total-reflecting the light reflected from said second total reflection plane into said medium; and an outlet plane forming an anti-reflection plane to make the light that is reflected from said third total reflection plane exit the medium.

2. A beam path expander as set forth in claim 1 wherein said incidence plane and outlet planes are vertical to said incident light and outgoing light respectively.

3. A large-area laser projection display system comprising:

a laser light source;

an optical system for making the light from said light source into an arbitrary parallel light;

an optical separating sub-system for separating the parallel light from the optical system into the light having a specific wavelength;

modulator means;

a focusing lens system for focusing the light from said optical separating sub-system on the modulator means;

a collimating lens system for making the light from said modulator means into parallel light;

an optical integrating sub-system for integrating the light from said collimating lens system into one light;

an optical system for scanning the light from said optical integrating sub-system horizontally and vertically; and beam path expanders according to claim 1 disposed between said focusing lens system and said modulator means.

4. A large-area laser projection display system comprising:

a laser light source;

an optical system for making the light from said light source into an arbitrary parallel light;

an optical separating sub-system for separating the parallel light from the optical system into the light having a specific wavelength;

modulator means;

a focusing lens system for focusing the light from said optical separating sub-system on the modulator means;

a collimating lens system for making the light from said modulator means into parallel light;

an optical integrating sub-system for integrating the light from said collimating lens system into one light;

an optical system for scanning the light from said optical integrating sub-system horizontally and vertically; and beam path expanders according to claim 1 disposed between said modulator means and said collimating lens system.

5. A large-area laser projection display system comprising:

a laser light source;

an optical system for making the light from said light source into an arbitrary parallel light;

an optical separating sub-system for separating the parallel light from the optical system into the light having a specific wavelength;

modulator means;

a focusing lens system for focusing the light from said optical separating sub-system on the modulator means;

a collimating lens system for making the light from said modulator means into parallel light;

an optical integrating sub-system for integrating the light from said collimating lens system into one light;

an optical system for scanning the light from said optical integrating sub-system horizontally and vertically; and beam path expanders according to claim 1 disposed between said focusing lens system and said modulator means as well as between said modulator means and said collimating lens system.

6. In a method for reducing a beam path, a method for expanding beam path comprising the steps of:

admitting light having a specific wavelength into a medium without reflection;

first-reflecting said admitted light in the medium at a total reflection angle determined by the refractive index of said medium;

second-reflecting said first-reflected light in the medium at said total reflection angle;

third-reflecting said second-reflected light forward at said total reflection angle in a direction opposite a direction of the light admitted into the medium;

repeating the total reflections such as said second reflection and third reflection for forming a specific light path; and exiting the reflected light from the medium.

7. In a large-area laser projection display system comprising a laser light source, an optical system for making light from said light source into an arbitrary parallel light, an optical separating sub-system for separating the parallel light from the optical system into light having a specific wavelength, modulator means, a focusing lens system for focusing the light from said optical separating sub-system on the modulator means, a collimating lens system for making the light from said modulator means into parallel light, an optical integrating sub-system for integrating the light from said collimating lens system into one light, and an optical system for scanning the light from said optical integrating sub-system horizontally and vertically, a large-area laser projection display system having a small compacted optical system comprising:

beam path expanders located between said focusing lens system and said modulator means, or between said modulator means and collimating lens system, or between said focusing lens system and modulator means as well as between said modulator means and said collimating lens system.

8. A large area laser projection display system comprising a small compacted optical system as set forth in claim 7, wherein in said beam path expander comprises:

an incidence plane forming an anti-reflection plane to admit light having a specific wavelength into a medium having arbitrary refractive index without reflection;

a first total reflection plane that is cut into the beam path expander at a total reflection angle determined by the refractive index of said medium for total-reflecting the light admitted from said incidence plane in said medium;

a second total reflection plane that is cut into the beam path expander at said total reflection angle for total-reflecting the light reflected from said first total reflection plane at said total reflection angle in said medium;

n third total reflection plane(s) (n=0, 1, 2, . . . ) cut into the beam path expander at said total reflection angle for forming a specific light path by total-reflecting the light reflected from said second total reflection plane into said medium; and an outlet plane forming an anti-reflection plane to make the light that is reflected from said third total reflection plane exit from said medium.

9. A large area laser projection display system as set forth in claim 8, wherein said incidence plane and outlet planes are vertical to said incident light and outgoing light respectively.

10. A large area laser projection display system as set forth in claim 9, wherein said laser light source is white light.

11. A large area laser projection display system as set forth in claim 10, wherein said modulator means, said focusing lens system and said collimating lens system are each comprised of three devices corresponding to laser beams of red, green and blue frequencies, respectively.

12. A large area laser projection display system as set forth in claim 8, wherein said laser light source is white light.

13. A large area laser projection display system as set forth in claim 12, wherein said modulator means, said focusing lens system and said collimating lens system are each comprised of three devices corresponding to laser beams of red, green and blue frequencies, respectively.

* * * * *